United States Patent [19]

Sanders et al.

[11] 4,105,975
[45] Aug. 8, 1978

[54] OFFSET CORRECTION CIRCUIT FOR PHASE DETECTORS

[75] Inventors: David E. Sanders, St. Petersburg; Ramon P. Chambers, Clearwater; Robert S. Gordy, Largo, all of Fla.

[73] Assignee: NCR Corporation, Dayton, Ohio

[21] Appl. No.: 764,604

[22] Filed: Feb. 1, 1977

[51] Int. Cl.$^2$ .......................................... H04L 27/22
[52] U.S. Cl. .................................. 325/320; 325/421
[58] Field of Search .............. 325/320, 421, 422, 423; 328/133–134; 329/122, 124; 331/1 A; 307/232; 178/69.1, 88

[56] References Cited

U.S. PATENT DOCUMENTS

| 3,777,272 | 12/1973 | Fletcher | 325/320 |
| 3,936,758 | 2/1976 | Kostelnicek et al. | 328/133 |

Primary Examiner—Benedict V. Safourek
Attorney, Agent, or Firm—J. T. Cavender; Edward Dugas

[57] ABSTRACT

An offset error correction circuit for improved reception of signals by compensating for any offset error voltage produced by a phase detector in the absence of an input signal to the detector. The error correction circuit translates the offset error voltage into a digital value and stores that value in a counter. When a PSK signal is applied to the circuit, the error correction circuit subtracts the stored value of the offset error voltage from the output of the phase detector which compensates for the offset error. The compensation for the offset error provides an improved signal to noise ratio.

8 Claims, 2 Drawing Figures

OFFSET CORRECTION CIRCUIT FOR PHASE DETECTORS

BACKGROUND OF THE INVENTION

1. Field of the Invention

The invention relates to an offset correction circuit for a phase detector producing an offset error voltage. More particularly, the invention relates to an offset correction circuit which determines and stores the offset error voltage of the phase detector prior to the application of an input signal to the phase detector.

2. Description of the Prior Art

As is well known in the art, phase modulation is utilized to transmit information. One system of phase modulation, known as phaseshift keying (PSK), modulates digital information by shifting the phase parameter of an AC carrier signal usually between 0° and 180°. This type of modulated signal is generally transmitted as a suppressed carrier signal. Demodulation of a PSK signal requires that the PSK signal be multiplied by a reference signal generated in the demodulator. The reference signal must manifest accurately the frequency and phase of the incoming PSK signal. The components in which the PSK signal and the reference signal generated in the demodulator are multiplied are generally designated as phase detectors or multipliers.

Even if the reference signal is at the correct frequency but slightly out of phase with the incoming PSK signal, the output will be attenuated. For a difference in phase of close to 90°, the output of the phase detector will be near zero and a difference greater than 90° will reverse the polarity of the output of the phase detector. Thus, it is desirable that the reference signal be accurately in phase with the incoming PSK signal.

A circuit which employs the above principles is a two phase-locked loop demodulator, also called a Costas loop demodulator. As the name implies, the output of the phase detectors is used as an input to a voltage controlled oscillator generating the reference signal. In a two phase-locked loop demodulator, each of the two loops has a phase detector but only one voltage controlled oscillator is provided. However, the reference signal to one loop is shifted 90° so that when the reference signal is in phase with the incoming PSK signal, the output of the phase detector in that loop is zero. The output of the phase detector in the other loop is negative or positive depending on whether the value of the phase difference is close to 0° or 180°, respectively.

It is well known that if the incoming signal has a low signal to noise ratio it is desirable that the output of the phase detectors not contain any offset error voltages. An offset error voltage being undesirable noise that is caused by variations in the parameters of the individual circuit elements of the phase detectors. The presence of this offset error voltage will constitute a portion of the input to the voltage controlled oscillator which generates the reference signal and will significantly degrade the performance of the phase-locked loop.

One means currently being utilized to obviate the possibility of an offset error voltage is to use expensive well-balanced phase detectors which do not produce an offset error voltage. Manual offset adjustments to correct for the offset error voltage have also been provided in the phase-locked loops.

SUMMARY OF THE INVENTION

The invention, an offset correction circuit, measures the DC offset error voltage at the output of a phase detector during a period when there is an absence of an incoming PSK signal to the phase detector. The output of the phase detector is passed through a low pass filter to the positive terminal of a threshold detector comparator used to compare voltages. The output of the threshold detector is a logic "1" if the difference between the inputs to its positive and negative terminals is positive and a logic "0" if the difference is negative. This logic output is fed to an up-down counter to cause the up-down counter to count up when the logic output is "1" and down when the logic output is "0". The function of the threshold detector is to selectively direct the up-down counter to count up or down.

A clock is provided to generate a train of pulses which are counted by the up-down counter when a certain condition is satisfied. An OR gate has as inputs the pulse train from the clock and a lock indication signal which denotes the presence of an incoming PSK signal to the phase detector. The OR gate acts as a switch and will pass the clock pulses through to be counted by the up-down counter until it receives the lock indication signal.

The binary output of the up-down counter is impressed on a Digital/Analog converter whose output is a step function directly related to the output of the up-down counter. The output of the Digital/Analog converter is connected to the negative terminal of both the threshold detector and a subtractor. This subtractor, an operational amplifier, also has for its positive input the output of the phase detector passed through a low pass filter.

In operation, the up-down counter will count pulses up until the output of the Digital/Analog converter is slightly greater than (or approximately equal to) the offset error voltage from the phase detector. The output of the threshold detector which was logic "1" will then go to logic "0" and the up-down counter will count down. The above process will continue and, thus, the value contained in the up-down counter and the output of the Digital/Analog converter will over a long period of time approximate an integration of the offset error voltage of the phase detector should there be any transients present. The output of the subtractor will be driven to approximately zero.

When an incoming PSK signal is applied to the phase detector, the lock indication signal applied to the OR gate prevents any further pulses being counted. Because no further pulses are being counted by the up-down counter, the count present therein when the lock indication signal is received will be stored or held until the lock indication signal goes off. Therefore, the output of the Digital/Analog converter will remain constant and is subtracted from the output of the phase detector by the subtractor, and the output of the subtractor will be corrected for the offset error voltage of the phase detector.

At a later time, when the incoming PSK signal has discontinued, the lock indicator signal will go off and the offset correction circuit will again measure the offset error voltage as described above.

DESCRIPTION OF THE PREFERRED EMBODIMENT

Figure 1:
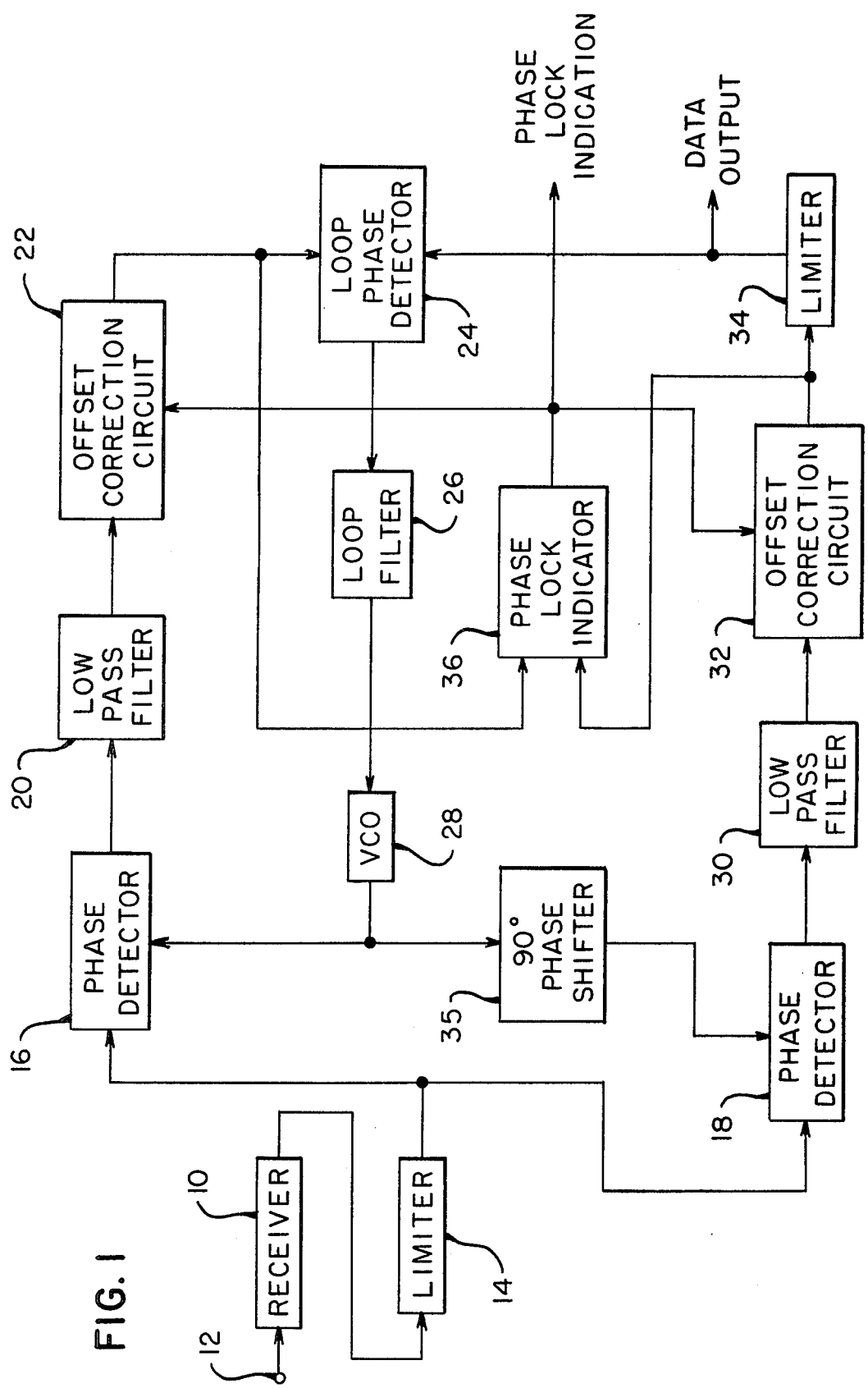
FIG. 1 shows a block diagram of a two phase-locked loop coherent demodulator embodying two of the error correction circuits of this invention.

With reference to FIG. 1, a receiver 10 is of a conventional design and adapted for use with phase-shift keying (hereinafter referred to as PSK) demodulators. A PSK modulated signal will from time to time be present at input terminal 12 of receiver 10.

A limiter 14 shapes the output of receiver 10 to a constant power level and prevents overload of other components. This constant power level PSK signal is impressed on phase detectors 16 and 18. The phase detectors can be of any standard design well known in the art. The upper phase-locked loop (as shown in FIG. 1) includes phase detector 16, low pass filter 20, offset correction circuit 22, loop phase detector 24, loop filter 26 and voltage controlled oscillator 28 (hereinafter referred to as VCO). The other loop of the two phase-locked loop demodulator shown in FIG. 1 comprises phase detector 18, low pass filter 30, offset correction circuit 32, limiter 34, loop phase detector 24, loop filter 26, VCO 28, and 90° phase shifter 35. It should be noted that all of the components of FIG. 1 are standard items except for offset correction circuits 22 and 32.

In order to demodulate an incoming PSK signal arriving at input terminal 12 and passing through receiver 10 and limiter 14, it is necessary that the reference signal generated by the VCO be accurate both in phase and frequency to that of the incoming PSK signal. The reference signal generated by VCO 28 is coupled to phase detector 16, and, after undergoing a 90° phase shift by phase shifter 35, to phase detector 18.

If the phase difference between the reference signal from VCO 28 and the incoming PSK signal is between 0° and 90°, the output of the phase detector 16 is a positive voltage proportional to the phase difference. On the other hand, when the phase difference is between 90° and 180°, the output voltage is a proportional negative voltage. If the reference signal approaches ± 90° out of phase with the incoming PSK signal, which is the case under normal locked conditions, the output of phase detector 16 will approach zero. The DC voltage from phase detector 16 passes through low pass filter 20, which filter attenuates undesired signal and noise components from the phase detector signal, and is corrected for any offset error voltage by offset correction circuit 22 (to be discussed hereinafter). The cutoff frequency of low pass filter 20 is fixed slightly above the data rate.

Phase detector 18 multiplies the PSK incoming signal by the 90° phase shifted signal from phase shifter 35 to produce a positive DC output voltage when the PSK signal and the phase shifted signal from phase shifter 35 are in phase. If the signals are out of phase close to 180°, the output of phase detector 18 will be a negative DC voltage. The magnitude of the voltage is inversely proportional to the magnitude of the phase difference between the signals. After filtering by low pass filter 30, the DC output is corrected for any offset error voltage (to be discussed in detail hereinafter) by offset correction circuit 32 and serves as the input to limiter 34.

Limiter 34 produces a fixed (+1) output if the input voltage applied to it is positive and a fixed (−1) output if the applied voltage is negative. This output serves two functions. First, it may be utilized as the data output. Second, it provides an input for loop phase detector 24. Loop phase detector 24 multiplies the output of limiter 34 by the output of offset correction circuit 22. This multiplication establishes the proper polarity for phase error correction voltage. After being filtered through loop filter 26 which establishes the loop bandwidth, the output of loop phase detector 24 provides the necessary phase and frequency control voltage information to VCO 28 to maintain accurate phase and frequency synchronization between the incoming PSK signal and the reference signal generated by VCO 28. The band width of the loop filter 26 is approximately less than 1/10 of the data rate, centered about zero.

Before discussing the role of the offset correction circuits 22 and 32 in the phase-locked loops, it should be noted that FIG. 1 also has a phase lock indicator 36. When an incoming PSK signal is applied to phase detectors 16 and 18, and the phase-locked loops operate as discussed above, the phase lock indicator determines that the loop is locked on a PSK signal and generates a phase lock indication signal. In order to perform this function, the phase lock indicator 36 has inputs from both offset correction circuits 22 and 32. The output of the phase indicator is a logic "1" for the phase lock indication and logic "0" for the unlocked condition. This logic output provides a necessary input to the offset correction circuits 22 and 32.

Figure 2:
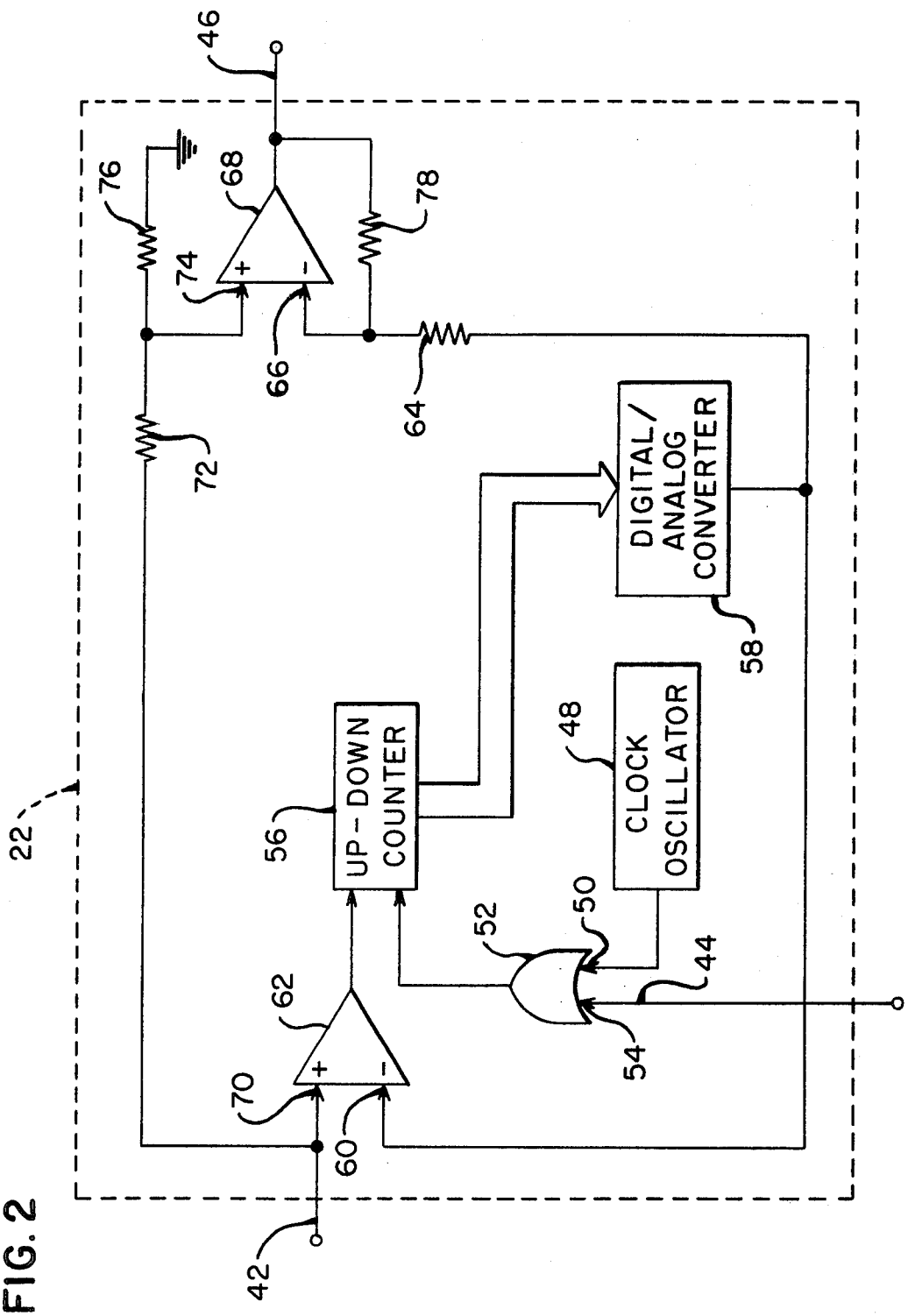
FIG. 2 is a block schematic of an offset correction circuit constructed according to the present invention.

The offset correction circuit 22 as shown in FIG. 2, is identical to offset correction circuit 32 and a detailed discussion of one will suffice for both. The error correction circuit 22 receives inputs from low pass filter 20 on lead 42 and from phase-locked loop indicator 36 on lead 44. The output of the error correction circuit 22 is connected to loop phase detector 24 by lead 46.

A pulse train is created by a clock oscillator 48 which is connected to one terminal 50 of an OR gate 52. Lead 44, which carries the output of phase lock indicator 36, is connected to another terminal 54 of OR gate 52. When the output of the phase lock indicator 36 is a logic "0", which indicates that there is an absence of an incoming PSK signal, the pulse train of the clock oscillator 48 will be passed on by OR gate 52 to the up-down counter 56 to be counted. If the phase lock indicator 36 is at logic "1", the pulse train will not be passed to the up-down counter 56. thus, OR gate 50 acts as a switch responsive to the lock indication signal. The number of pulses counted which constitutes the output of the up-down counter 56 is communicated to the Digital-/Analog converter 58. The Digital/Analog converter 58 generates a DC voltage which is a function of the number of counts in the up-down counter 56. Each pulse counted up or down will cause an incremental change in the DC output voltage of converter 58. The DC output of the Digital/Analog converter 58 is connected to the negative terminal 60 of threshold detector comparator 62 and through resistor 64 to the negative terminal 66 of operational amplifier 68. The positive terminal 70 of threshold detector 62 is connected to lead 42.

The threshold detector 62 compares the voltage present at its negative terminal to the voltage of the positive terminal and produces a logic output. This logic output instructs the up-down counter 56 whether it is to count the pulses up or to count the pulses down. For example, if the difference between the two voltages is positive, the threshold detector will produce a logic "1" and the up-down counter 56 will count the pulses up. On the other hand, if the difference is negative the output of the threshold detector 62 will be a logic "0" and the up-down counter 56 will count the pulses down.

The output of low pass filer 20 on lead 42 is coupled through resistor 72 to the positive terminal 74 of operational amplifier 68. A resistor 76 is connected between positive terminal 74 and ground. The negative terminal 66 of operational amplifier 68 has a feedback resistor 78 connected between it and lead 46 at the output of the operational amplifier 68. The resistors 64, 72, 76, and 78, associated with operational amplifier 68 are all of equal value and are arranged in order that the output of Digital/Analog converter 58 will be subtracted from the output of phase detector 16 after filtering by low pass filter 20.

In operation, assuming that there is an absence of an incoming PSK signal and, therefore, phase lock indicator 36 is at logic "0", the pulses from clock 48 pass through OR gate 52 to be counted by up-down counter 56. Assuming, also, that the threshold detector 62 is at logic "1", the up-down counter 56 will count up and the DC voltage output of Digital/Analog converter 58 will become mre positive. When the output of the Digital/Analog converter 58 exceeds the DC voltage present on lead 42, the threshold detector 62 will go to logic "0", and the up-down counter 56 will count down and the DC output of Digital/Analog converter 58 will become more negative. The threshold detector 62 is, as discussed above, comparing the output of the Digital/Analog converter 58 with the voltage present on lead 42. After the DC voltage of the Digital/Analog converter 58 is less than that of lead 42, the threshold detector 62 goes back to logic "1" and the up-down counter will count up again. So the DC output voltage of the Digital/Analog converter 58 will oscillate around the DC voltage on lead 42. Over a long period of time, the DC voltage of Digital/Analog converter 58 will tend to seek the average level of the DC voltage on lead 42, if it is subject to variation.

The DC voltage on lead 42 is (as discussed above) the output of detector 16 passed through low pass filter 20. The output of the phase detector 16 during the absence of an incoming PSK signal represents undesirable noise or offset error voltage. It follows that the DC output of Digital/Analog converter 58 should approximately equal that offset error voltage and will over a long period of time, if the output of phase detector 16 is varying, tend to integrate the offset error voltage of phase detector 16. It is desirable for the proper operation of the offset error correction circuit 22 that the up-down counter 56 be of sufficient size and the increments (DC voltage change/bit) of Digital/Analog converter 58 be small enough so that the value of the offset error voltage can be closely approximated. Also, smaller increments will be advantageous to the general stability of the entire demodulator.

Since the output of operational amplifier 68 represents the difference between the voltage of lead 42 (the filtered output of phase detector 16) and the DC voltage produced by Digital/Analog converter 58, the output of operational amplifier 68 will be driven to near zero. The output of operation amplifier 68 which is present on lead 46 is the output of the offset correction circuit 22 to loop phase detector 24.

When phase lock indicator 36 goes to logic "1" indicating that an incoming PSK signal is present and the loop is in operation, the OR gate 52 will go to logic "1" and no further pulses from the clock oscillator 48 will be passed to the up-down counter 56. Thus, the value of the up-down counter 56 at that moment is stored and the DC output voltage of the Digital/Analog converter 58 will remain a constant fixed value which should approximate the offset error voltage of phase detector 16

As the phase detector 16 multiplies the incoming PSK signal by the reference signal generated by VCO 28, its output amplitude and sign will vary. This information is passed through low pass filter 20 and has the DC output voltage of Digital/Analog converter 58 subtracted from it by operational amplifier 68.

Thus, the output of operational amplifier 68 comprises the instantaneous value of the voltage output of phase detector 16 after filtering less the approximate offset error voltage supplied by the Digital/Analog converter 58. Thus, the output of offset correction circuit 22 has been corrected for any offset error voltage produced by phase detector 16.

When there is again an absence of an incoming PSK signal, the offset error voltage will again be measured by the offset correction circuit 22 as discussed above.

Referring back to FIG. 1, offset correction circuit 32 would operate as discussed above. Its inputs are from phase detector 18 through low pass filter 30 and phase lock indicator 36. Its output is to limiter 34 and is corrected for any offset error voltage produced by phase detector 18. The phase and frequency information provided to VCO 28 from loop phase detector 24 will be corrected for any offset error voltage produced by phase detectors 16 and 18. This will result in increased accuracy of the signal generated by VCO 28 and an improvement in the signal to noise ratio of the data output of the phase detectors.

In summary, offset correction circuits 22 and 32 determine the value of the offset error voltage from phase detectors 16 and 18, respectively, during a period of time when there is an absence of an incoming PSK carrier signal to terminal 12. When a PSK signal is received, the value of the offset error voltage is stored in each offset correction circuit, 22 and 32, and subtracted from the instantaneous value of the respective phase detectors, 16 and 18. This provides improved phase and frequency information to the VCO 28 which will result in an improved signal to noise ratio.

There has been disclosed an error correction circuit for phase detectors which corrects the output of the phase detector for offset error voltage. The error correction circuit may form a portion of a phase-lock loop demodulator for a PSK signal communications system and will provide an improved signal to noise ratio. It is feasible to utilize the invention in many other applications where it is desirable to correct for the offset error voltage of a phase detector. Since undoubtedly modifications to the foregoing detailed description will be readily apparent to the those skilled in the art which do not constitute departures from the scope and spirit of the invention, the preferred embodiment described herein is to be considered exemplary only and not circumscriptive of the invention.

What is claimed is:

1. An error correction circuit comprising:

a phase detector means for providing a signal at its output indicative of a relationship between signals on its inputs;

means for providing a correction signal, which signal is a positive going signal in response to one state of a control signal and a negative going signal in response to another state of the control signal;

a comparison means for comparing said correction signal with the signal present at the output of said phase detector to generate said control signal, the state of which is said one state when said correction signal is below the signal at the output of said phase detector and of said another state when said correction signal is above the signal at the output of said phase detector;

means for subtracting said correction signal from the signal provided by said phase detector means to provide an error corrected signal for correcting errors inherent in said phase detector means; and means for maintaining said correction signal substantially constant during a selected operating condition of said phase detector means.

2. The error correction circuit of claim 1 wherein said means for providing a correction signal is comprised of:
an up-down counter means for providing an up-count as a positive going signal and a down-count as a negative going signal; and
a digital to analog converter for converting the count in said up-down counter means into said correction signal.

3. The error correction circuit of claim 1 wherein said means for maintaining said correction signal is comprised of:
a logic switch means operatively connected to said means for providing, said logic switch means responsive to a phase lock indication for preventing a further change in said correction signal, and to an unlocked indication for allowing further changes in said correction signal.

4. An error correction circuit for a phase detector of a phase lock loop, comprising:
(a) a phase detector for providing an output signal indicative of the phase relationship of signals received at its inputs;
(b) means for sensing the output of said phase detector and during the unlocked period of phase lock loop operation deriving an error signal the average value of which corresponds to the output signal provided by said phase detector and during the locked period of phase lock loop operation providing a fixed error signal which corresponds to the last derived error signal prior to the period of phase lock loop operation; and
(c) means for subtracting said fixed error signal from said phase detector output signal only during the locked period of phase lock loop operation so as to remove the error signal component from said phase detector output signal.

5. The error correction circuit according to claim 4 wherein said means for sensing is comprised of:
a comparator means for receiving as one input, the output of said phase detector and at another input an error signal, said comparator means providing an output which is a function of the difference between the signals at its input;
a counter means for counting the transitions in the output signal from said comparator means;

means for averaging the count from said counter means to provide said error signal; and
means for preventing further counting by said counter means during locked periods of phase lock loop operation.

6. The error correction circuit according to claim 5 and further comprising:
clock means operatively connected to said counter means for generating a pulse train to be counted by said counter means; and
switch means interposed between said clock means and said counter means and responsive to a lock indication for connecting said generated pulse train to an input of said counter.

7. An offset error correction circuit for a phase detector in a demodulator for an incoming phase-shift keyed signal, said phase detector being adapted to receive said incoming signal as an input and generating an offset error voltage, said offset error voltage comprising the output of said phase detector when said incoming signal is absent, and said demodulator having an indicator means generating a phase lock indication when said incoming signal is impressed on said phase detector, comprising:
(a) a clock oscillator for generating a pulse train;
(b) a switch means connected to said clock oscillator and responsive to said phase lock indication for opening said switch means;
(c) an up-down counter connected to said clock oscillator through said switch means when said switch means is closed and adapted to count each pulse of said pulse train selectively up to increase its digital output and down to decrease its digital output;
(d) a converter in communication with said counter for converting the digital output of said counter to an analog output;
(e) a comparator means for comparing the output of said converter and the output of said phase detector and selectively directing said counter to count each pulse up and down for obtaining an output of said converter approximately equal to said offset error voltage; and
(f) a subtractor means connected to said phase detector and said converter for subtracting the output of said converter from the output of said phase detector to correct for said offset error voltage.

8. In a phase-locked loop demodulator for demodulating an incoming phase-shift keying signal, the demodulator including a phase detector being impressed with said incoming signal and generating a direct current offset error voltage, said offset error voltage comprising the output of said phase detector when said incoming signal is absent, a voltage controlled oscillator having its output connected to said phase detector and an indicator means coupled to said loop for generating a phase lock indication when said incoming signal is present, the improvement comprising:
(a) a clock oscillator generating a pulse train;
(b) a switch means connected to said clock oscillator and responsive to said phase lock indication for opening said switch means;
(c) a counter connected to said switch means and adapted for counting each pulse of said pulse train from said clock oscillator selectively up and down when said switch means is closed;
(d) a converter in communication with said counter for converting the output of said counter to a direct current output;

(e) a comparator means for comparing the outputs of said converter and said phase detector, and for directing said counter to count up when the output of said converter is less than the output of said phase detector and down when the output of said converter exceeds the output of said phase detector for obtaining an output of said converter approximately equal to said offset error voltage; and (f) a subtractor means connected to said phase detector and said converter for subtracting the output of said converter from the output of said phase detector to correct for said offset error voltage, said subtractor means having its output coupled to the input of said voltage controlled oscillator whereby the output of said voltage controlled oscillator is controlled by the output of said phase detector corrected for said offset error voltage.

* * * * *